(12) United States Patent  
Ashino

(10) Patent No.: US 12,504,561 B2  
(45) Date of Patent: Dec. 23, 2025

(54) CONCEALMENT METHOD AND CONCEALMENT SYSTEM

(71) Applicant: NEC Corporation, Tokyo (JP)

(72) Inventor: Yuki Ashino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 351 days.

(21) Appl. No.: 18/273,180

(22) PCT Filed: Mar. 8, 2022

(86) PCT No.: PCT/JP2022/010121  
§ 371 (c)(1),  
(2) Date: Jul. 19, 2023

(87) PCT Pub. No.: WO2022/209644  
PCT Pub. Date: Oct. 6, 2022

(65) Prior Publication Data  
US 2024/0085593 A1    Mar. 14, 2024

(30) Foreign Application Priority Data

Mar. 30, 2021  (JP) ................................. 2021-056507

(51) Int. Cl.  
G02B 3/00      (2006.01)  
G02B 5/20      (2006.01)

(52) U.S. Cl.  
CPC ............. *G02B 3/005* (2013.01); *G02B 5/201* (2013.01)

(58) Field of Classification Search  
None  
See application file for complete search history.

(56) References Cited

U.S. PATENT DOCUMENTS

| 11,974,686 | B1 * | 5/2024 | Ruble ................... G02B 3/005 |
| 2003/0054894 | A1 | 3/2003 | Fiedler |
| 2004/0194188 | A1 | 10/2004 | Tooley |
| 2017/0010451 | A1 | 1/2017 | Naya |

FOREIGN PATENT DOCUMENTS

| JP | 2012-061218 A | 3/2012 |
| JP | 3185126 U | 8/2013 |
| JP | 2015-198400 A | 11/2015 |
| WO | 2015/146167 A1 | 10/2015 |
| WO | 2020/006621 A1 | 1/2020 |

OTHER PUBLICATIONS

International Search Report for PCT Application No. PCT/JP2022/010121, mailed on May 31, 2022.  
JP Office Action for JP Application No. 2023-510762, mailed on May 14, 2024 with English Translation.  
JP Office Communication for JP Application No. 2023-510762, mailed on Jul. 9, 2024 with English Translation.

\* cited by examiner

*Primary Examiner* — Richard H Kim  
(74) *Attorney, Agent, or Firm* — Sughrue Mion, PLLC

(57) ABSTRACT

A concealment method includes: acquiring image data showing a background of an object; detecting a change in a component in a predetermined direction included in the image data; determining a pseudo direction of the image data on the basis of the result of the detection; and arranging, between the object and an observation position of the object, a first concealment body including a plurality of optical elements having a property of refracting light rays in a predetermined direction and continuously arranged in an arrangement direction in a state of the arrangement direction being oriented in a direction along the pseudo direction.

9 Claims, 19 Drawing Sheets

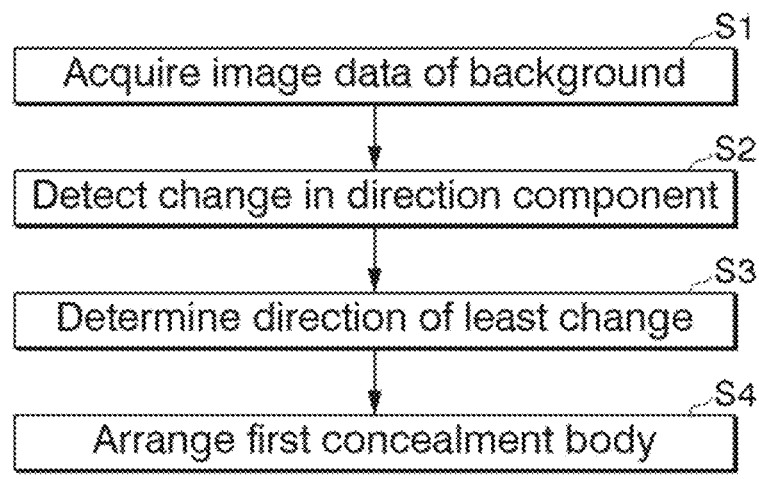
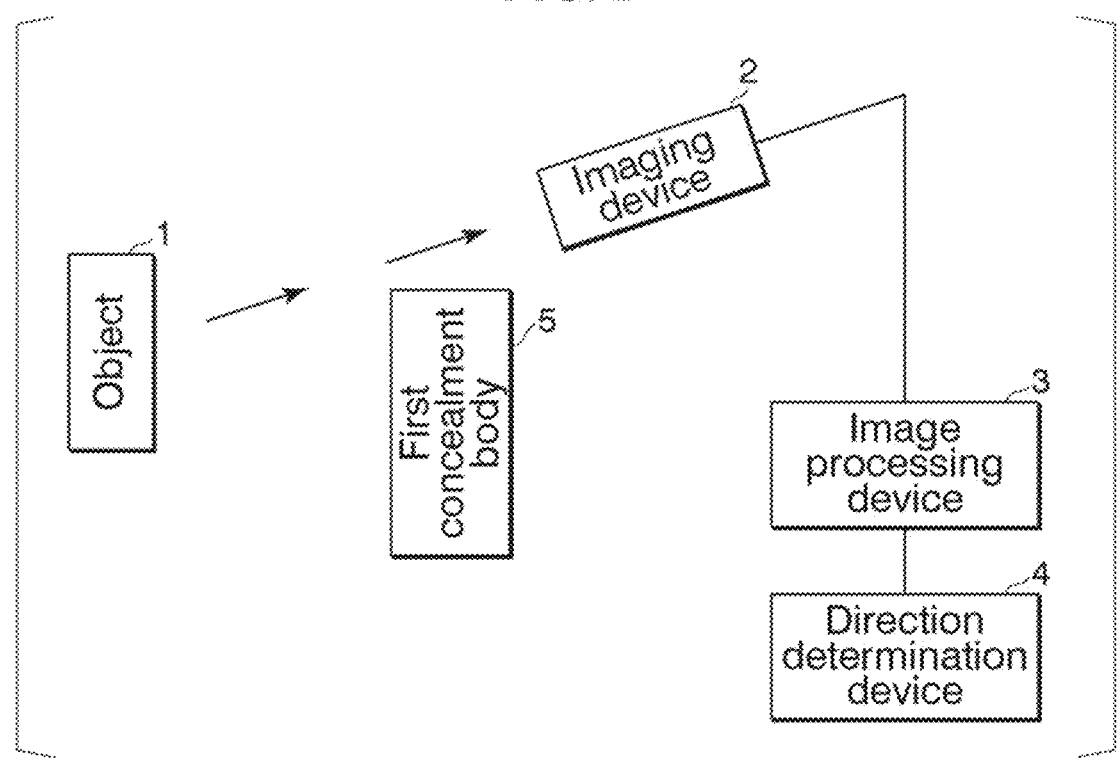

CONCEALMENT METHOD AND CONCEALMENT SYSTEM

This application is a National Stage Entry of PCT/JP2022/010121 filed on Mar. 8, 2022, which claims priority from Japanese Patent Application 2021-056507 filed on Mar. 30, 2021, the contents of all of which are incorporated herein by reference, in their entirety.

TECHNICAL FIELD

This disclosure relates to a concealment method and a concealment system.

BACKGROUND ART

With the spread of telework, there are more and more opportunities for one user to hold a meeting with another user by exchanging images and sound while at his/her own seat in the office or at home, rather than in a dedicated meeting room.

In such meetings, it is inevitable that the environment of one user's office or home is exposed to other users through video images. In addition, from the standpoint of protecting personal information, there is a desire not to disclose images with unnecessary backgrounds, such as walls and furniture in the home or office to the outside world.

Patent documents 1 and 2 related to the present disclosure disclose lamp houses utilizing lenticular lenses and prisms, which are optical elements that, by being placed in front of an object, make a portion of that object difficult to see for the viewer.

PRIOR ART DOCUMENTS

Patent Documents

Patent Document 1: Japanese Utility Model Registered Publication No. 3185126
Patent Document 2: PCT International Publication No. WO2015/146167

SUMMARY OF THE INVENTION

Problems to be Solved by the Invention

However, it is difficult to achieve the effect of making the object difficult to see in both of the techniques described in patent documents 1 and 2 unless the optical elements are placed at appropriate distances and angles with respect to the object and the viewer. No specific method has yet been proposed for application to the use of obscuring backgrounds and the like that are not to be made public at home or in the office.

An example of an object of the present disclosure is to provide a method and system that can conceal an object so that it becomes difficult to see according to its position and distance from a viewer.

Means for Solving the Problem

A first concealment method according to the first example aspect of the present disclosure includes: acquiring image data showing a background of an object; detecting a change in a component in a predetermined direction included in the image data; determining a pseudo direction of the image data on the basis of the result of the detection; and arranging, between the object and an observation position of the object, a first concealment body including a plurality of optical elements having a property of refracting light rays in a predetermined direction and continuously arranged in an arrangement direction in a state of the arrangement direction being oriented in a direction along the pseudo direction.

The concealment system according to the second example aspect of the present disclosure includes an imaging device that captures an image of an object to acquire image data showing a background of the object; an image processing device that detects a change in a component in a predetermined direction included in the image data; a direction determination device that determines a pseudo direction of the image data on the basis of the result of the detection by the image processing device; and a first concealment body including a plurality of optical elements having a property of refracting light rays in a predetermined direction and continuously arranged in an arrangement direction and arranged between the object and an observation position of the object in a state of the arrangement direction being oriented in a direction along the pseudo direction.

Effect of Invention

According to this disclosure, it is possible to make an object difficult to see for the viewer.

BRIEF DESCRIPTION OF THE DRAWINGS

FIG. 1 is a process diagram of a configuration example of the concealment method of the present disclosure.

FIG. 2 is a block diagram of a configuration example of a concealment system according to the present disclosure.

EXAMPLE EMBODIMENT

Figure 3:
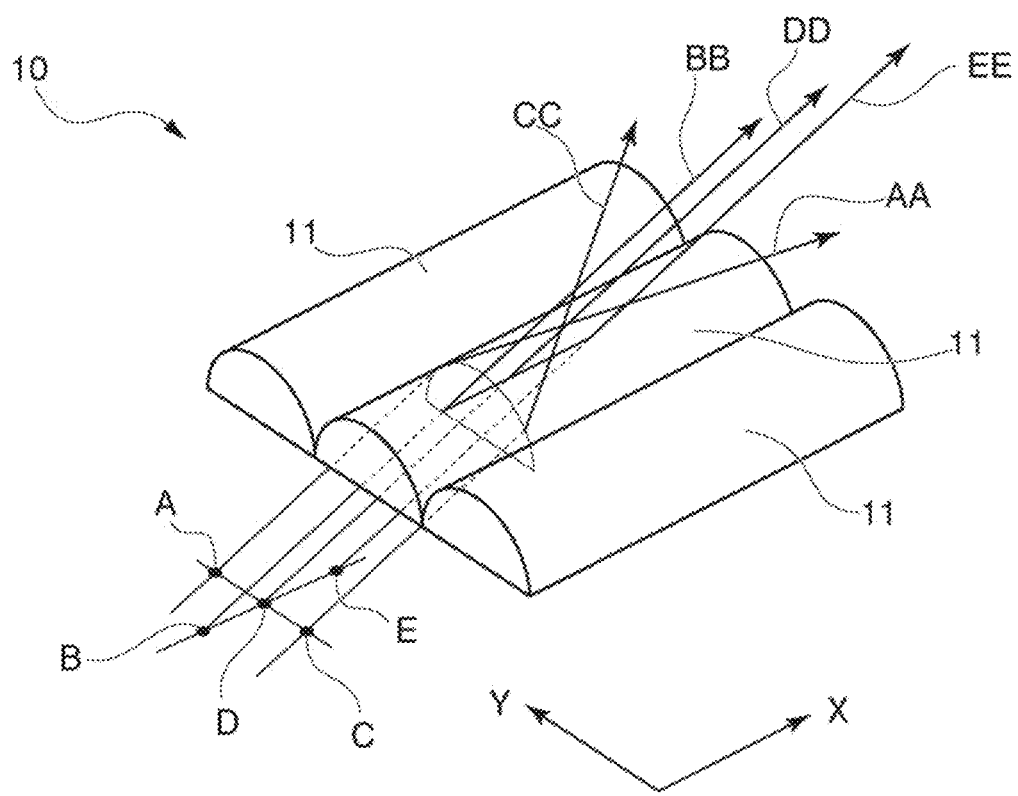
FIG. 3 is a perspective view showing the appearance of a lenticular lens, which is an optical element used in the concealment method according to the first example embodiment.

FIG. 1 shows a configuration example of the concealment method of the present disclosure.

The method has a step S1 of acquiring image data of the background of an object, a step S2 of detecting changes in components in a predetermined direction included in the image data, and a step S3 that determines a pseudo direction of the image data based on the detection result. Furthermore, the method has a step S4 of arranging, between the object and an observation position thereof, a first concealment body, in which optical elements having a property of refracting light rays in a predetermined direction are continuously arranged, with the arrangement direction of the optical elements oriented in a direction along the pseudo direction.

According to the above configuration, the image of an object reaching the viewer can be made less conspicuous by determining from the image data the direction of least change in the background of the object as the pseudo direction for the installation of the first concealment body, and passing the optical element of the first concealment body oriented in a direction orthogonal to this direction.

FIG. 2 shows an example of the configuration of the concealment system according to the present disclosure.

The system has an imaging device 2, an image processing device 3, a direction determination device 4, and a first concealment body 5. The imaging device 2 captures an image of the object 1 together with its background to obtain image data. The image processing device 3 detects changes in components in a predetermined direction in the image data obtained from this imaging device 2. Based on the detection results of the image processing device 3, the direction determination device 4 determines a pseudo direction based on changes in the image. The first concealment body 5 has a plurality of optical elements each having a property of refracting light rays in a predetermined direction and continuously arranged, and is arranged between the object and the observation position thereof with the arrangement direction of the plurality of optical elements being oriented in a direction along the pseudo direction.

According to the above configuration, the image data acquired by the imaging device 2 is processed by the image processing device 3, the direction of least change in the background of the object 1 is determined by the direction determination device 4 as the pseudo direction, and the first concealment body 5 is arranged oriented in a direction orthogonal to this direction. This makes the reflected light of the object reaching the viewer less conspicuous.

First Example Embodiment 1

The configuration for the first example embodiment of this disclosure, which embodies FIGS. 1 and 2, is described with reference to FIGS. 3 to 8. In FIGS. 3 to 8, components common to FIGS. 1 and 2 are denoted with the same reference numerals to simplify the explanation.

FIG. 3 shows an overview of the optical characteristics of a lenticular lens 10 used as the first concealment body in the first example embodiment. The lenticular lens 10 is composed of a plurality of semi-cylindrical bodies 11 as optical elements arranged continuously in a direction (referred to as the Y direction in FIG. 3 (the second direction, arrangement direction)) orthogonal to the longitudinal direction of the semi-cylindrical bodies 11 themselves (referred to as the X direction in FIG. 3 (first direction orthogonal to the arrangement direction)). Each of the plurality of semi-cylindrical bodies 11 is columnar in shape with a semi-circular cross-section (not limited to a perfect circle, but also including curved surfaces such as ellipses and other circular shapes with varying radii of curvature). More specifically, the optical elements (semi-cylindrical bodies) 11 constituting the lenticular lens 10 are arranged side by side in the Y direction, which intersects (orthogonal in the illustrated example) with the X direction, if the longitudinal direction is the X direction.

Light rays passing through each semi-cylindrical body 11 refract in various directions, as shown in FIG. 3, from points A, B, C, D, and E to arrows AA, BB, CC, DD, and EE. Therefore, the viewer cannot perceive the original points A, B, C, D, and E. Thus, the effect of concealing the object is achieved.

Figure 4A:
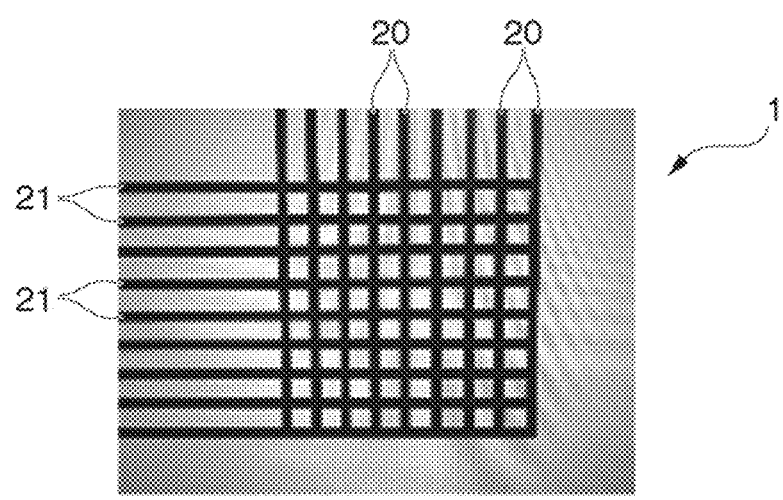
FIG. 4A is an original diagram showing an example of the shape of the object according to the first example embodiment.
Figure 4B:
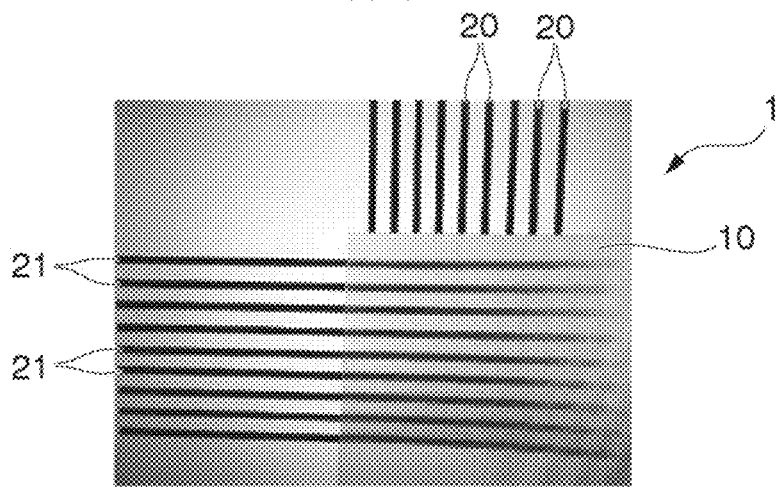
FIG. 4B shows an image of the shape shown in FIG. 4A as viewed through the first concealment body when the first concealment body, an optical element, is oriented in the first direction.
Figure 4C:
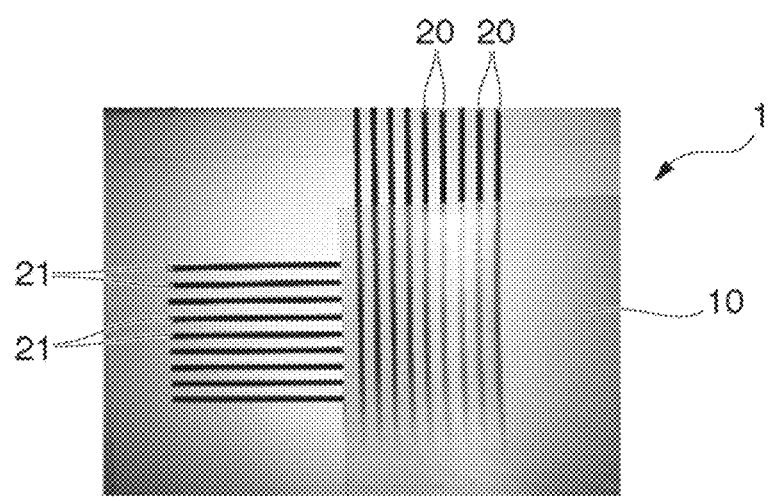
FIG. 4C shows an image of the shape shown in FIG. 4A as viewed through the first concealment body when the first concealment body, an optical element, is oriented in the second direction.

When the lenticular lens 10 is arranged such that, with respect to the object 1 arranged on one side of the lenticular lens 10, for example, a mesh-like pattern composed of vertical lines 20 and horizontal lines 21 as shown in FIG. 4A, the first direction thereof (X direction in FIG. 3) faces vertically (parallel to the vertical lines), the horizontal lines 21 appear to extend horizontally while the vertical lines 20 are not visible, as shown in FIG. 4B. When the lenticular lens 10 is arranged such that the aforementioned first direction faces horizontally (parallel to the horizontal lines), the horizontal lines are not visible while the vertical lines appear to extend vertically, as shown in FIG. 4C.

The respective steps of the method of concealing the object 1 by means of a lenticular lens 10 having these characteristics are described with reference to FIGS. 5, 6a, 6b, and 7.

Figure 6A:
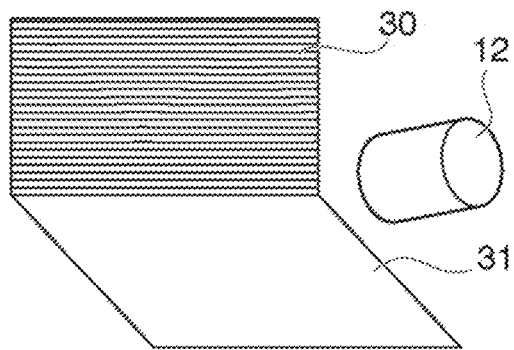
FIG. 6A is an explanatory diagram of the concealment by the concealment system of FIG. 5, showing a perspective view before installing the concealment body.

As shown in FIG. 6A, an image of a background 30 and the floor 31 connected thereto is acquired by the imaging unit 12 serving as an imaging device. The background 30 is, for example, a brick wall shown by the reference numeral 50 in FIG. 8A. As the background 30, image data with little variation in the substantially horizontal direction is imaged. In FIG. 6A, this background 30 is represented by horizontal stripes. The floor 31 is, for example, the all-white ground covered with snow, shown by the reference numeral 51 in FIG. 8A. In FIG. 6A, this floor 31 is represented as a white-out area surrounded by contour lines.

Figure 5:
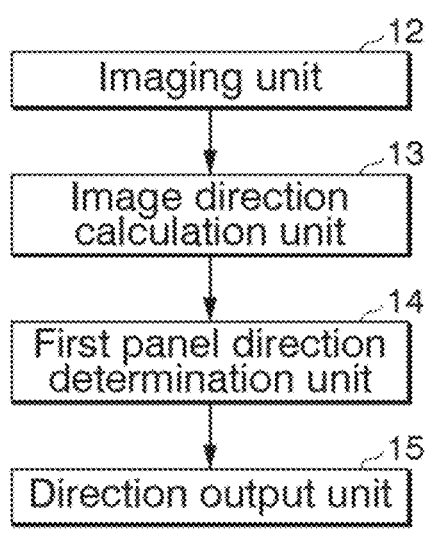
FIG. 5 is a block diagram of a concealment system according to the first example embodiment.

As shown in FIG. 5, an image direction calculation unit 13, as the image processing device, processes the image data captured by the imaging unit 12. The image direction calculation unit 13 calculates changes in each direction within the plane containing the image by performing, for example, differential calculations on the image data of the background 30. A first panel direction determination unit 14, as the direction determination device, determines as the pseudo direction of the object 1 a direction with the smallest differential value, that is, the smallest rate of change of the image data and the least amount of change. For example, the first panel direction determination unit 14 determines the horizontal direction in which the bricks line up in the brick wall 50 as the pseudo direction of object 1. The direction output unit 15 receives the supply of data about the pseudo direction determined by the first panel direction determination unit 14 and notifies the user, for example, by image or sound. In the example in FIG. 5, the output of the direction output unit 15 is the orientation of the first panel. At least part of the concealment system shown in FIG. 5 may be a computer containing a CPU and memory. In other words, at least some of the functions of the concealment system may be realized by the CPU executing a program stored in memory.

Figure 7:
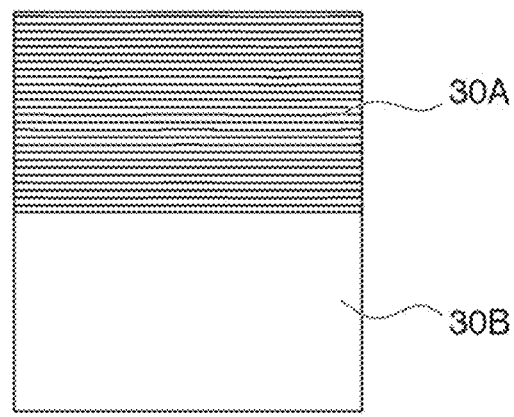
FIG. 7 is an explanatory diagram of an image captured by an imaging device of the concealment system of FIG. 5.

When the background 30 consists of simple horizontal stripes as shown in FIG. 6A, the image data is acquired as shown in FIG. 7, with the image 30A of the horizontal stripes at the top and the image 31A of the floor surface in a solid color at the bottom. In this case, the image direction calculation unit 13 calculates the values of "H (horizontal): 100%, V (vertical): 0%." As a result, the first panel direction determination unit 14 can determine that the background 30 has a continuous shape in the horizontal direction.

Figure 6B:
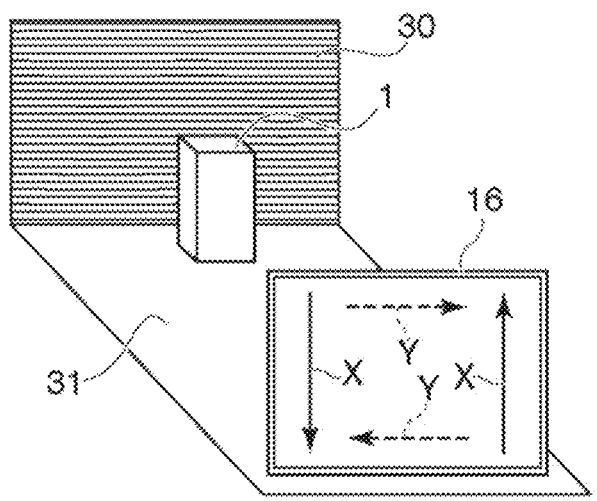
FIG. 6B is an explanatory diagram of the concealment by the concealment system of FIG. 5, showing a perspective view after installing the concealment body.

Since the pseudo direction reported by the direction output unit 15 is horizontal, the user places the first panel 16 as a concealment body with the lenticular lens 10 as the first concealment body in front of the object 1, as shown in FIG. 6B. In this case, the first panel 16 is arranged with the first direction (X-direction), which is the longitudinal direction of the lenticular lens, in the vertical orientation shown in FIG. 6B. In other words, the first panel 16 is arranged so that the X-direction of the lenticular lens 10 is oriented in a direction orthogonal to the horizontal direction, which is the pseudo direction determined by the first panel direction determination unit 14.

Figure 8A:
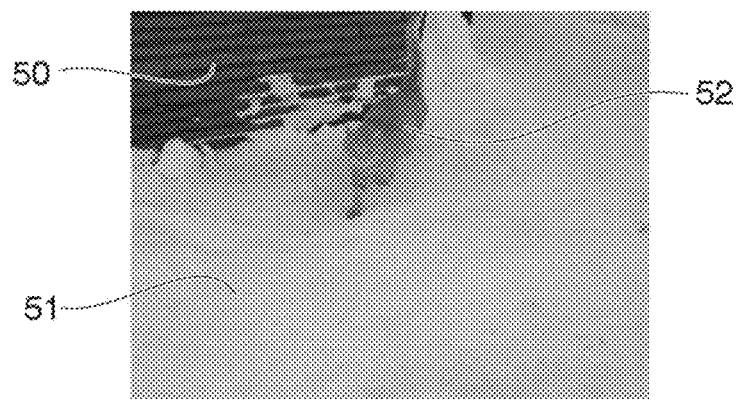
FIG. 8A is a diagram showing an image of the object to be concealed by the concealment system of FIG. 5, showing an image before the object is concealed.
Figure 8B:
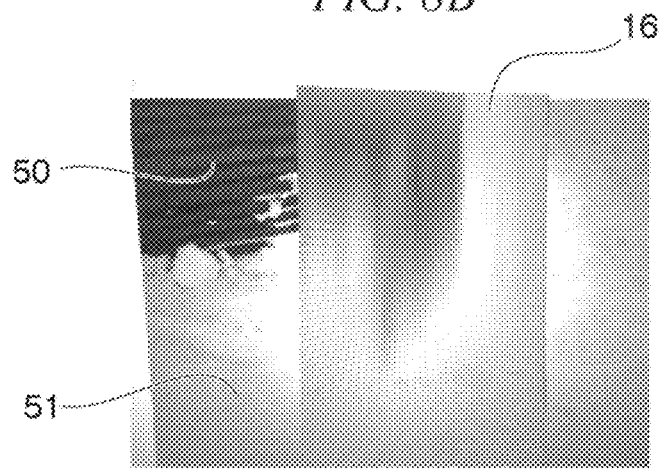
FIG. 8B shows the image of the object shown in FIG. 8A with the optical element oriented in the longitudinal direction.
Figure 8C:
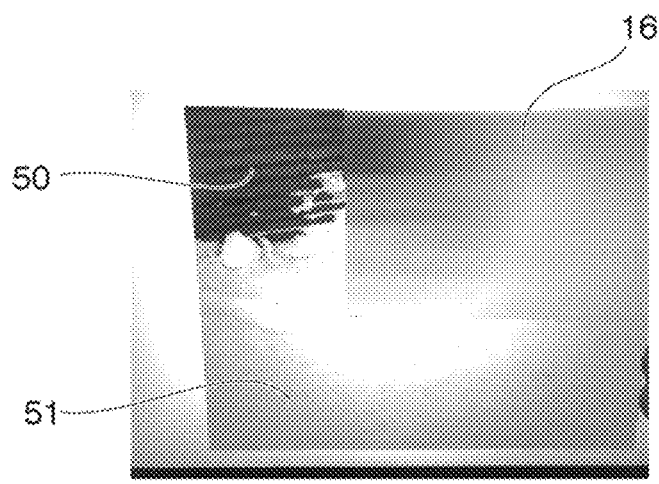
FIG. 8C shows the image of the object shown in FIG. 8A with the optical element oriented in the vertical direction.

FIG. 8A shows the image of the object (a cat) 52 that was visible to the viewer without the first panel 16 in place. According to the concealment method of the first example embodiment, when the first direction of the first panel 16 is arranged with a horizontal orientation, as shown in FIG. 8B, the image of the object (cat) 52 is visible to the extent that its presence is visible. On the other hand, when the first direction of the first panel 16 is arranged with a vertical orientation, as shown in FIG. 8C, the image of the object 52 is visible to the extent that its presence is invisible.

In other words, by orienting the first direction of the first panel 16 orthogonally to the pseudo direction (horizontal direction in FIGS. 8A to 8C), the image of the object 52 can be concealed and made difficult to perceive by a viewer so as to blend into the image of the brick wall 50, which is a background with a high proportion of horizontal components.

Second Example Embodiment

The configuration of the second example embodiment of the present disclosure, which embodies FIGS. 1 and 2, is described with reference to FIGS. 9A through 11D. In FIGS. 9A through 11D, components common to FIGS. 1 through 8C are denoted with the same reference numerals to simplify the explanation.

Figure 9A:
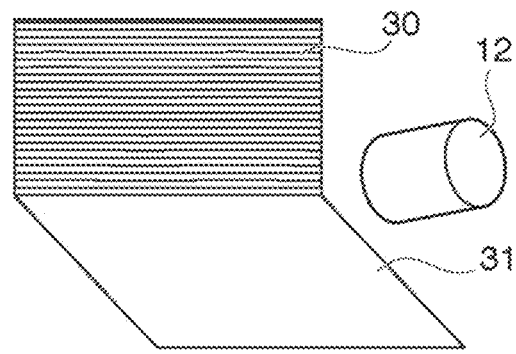
FIG. 9A is an explanatory diagram of a concealment system according to the second example embodiment, showing a perspective view before installing the concealment body.
Figure 9B:
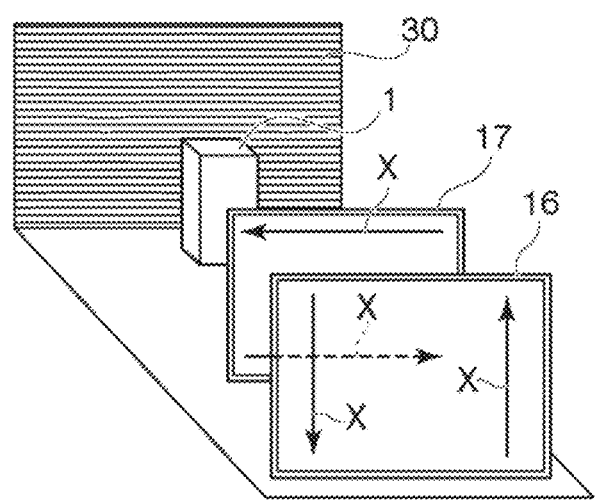
FIG. 9B is an explanatory diagram of a concealment system according to the second example embodiment, showing a perspective view after installing the concealment body.
Figure 10:
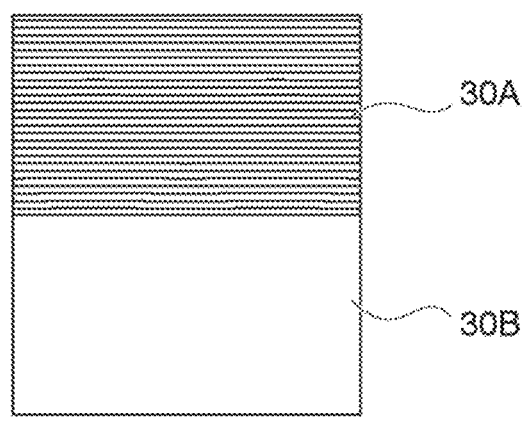
FIG. 10 is an explanatory diagram of an image captured by the imaging device of the concealment system of FIG. 9A.
Figure 11A:
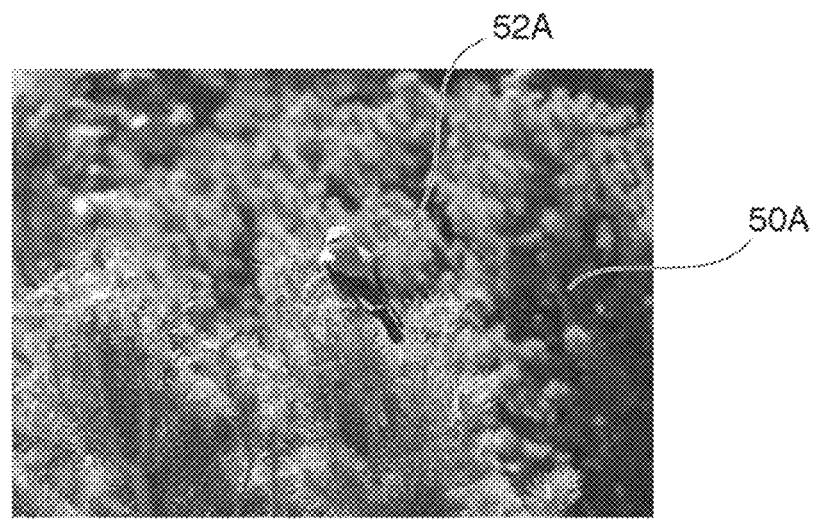
FIG. 11A is a diagram showing an image of the object to be concealed by the concealment system of FIG. 9B, showing an image before the object is concealed.

As shown in FIG. 9A, an image of the background 30 and the floor 31 connected to it is acquired by the imaging unit 12 serving as an imaging device. The imaging unit 12 may be a camera. Here, the background 30 is, for example, a thicket of trees shown in FIG. 11A with the reference numeral 50A. In FIG. 9A, this background 30 is represented by horizontal stripes. In FIG. 11A, there is no area corresponding to the floor 31. The object is the bird shown in FIG. 11A with the reference numeral 52A. When the background 30 is a simple pattern of horizontal stripes as shown in FIG. 9A, the image data is acquired as shown in FIG. 10, with the image 30A of the horizontal stripes at the top and the image 31A of the floor surface in a solid color at the bottom.

Even in this second example embodiment, the image direction calculation unit 13 performs differentiation and other processing on the image data acquired by the imaging unit 12, and the direction determined by the first panel direction determination unit 14 is reported to the user by the direction output unit 15.

The user arranges the first panel 16 vertically and a second panel 17 horizontally according to the direction reported. In other words, the user positions the first panel 16 so that the first direction X is vertical and the second panel 17 so that the first direction X is horizontal and the second direction Y is vertical, according to the direction reported.

Figure 11B:
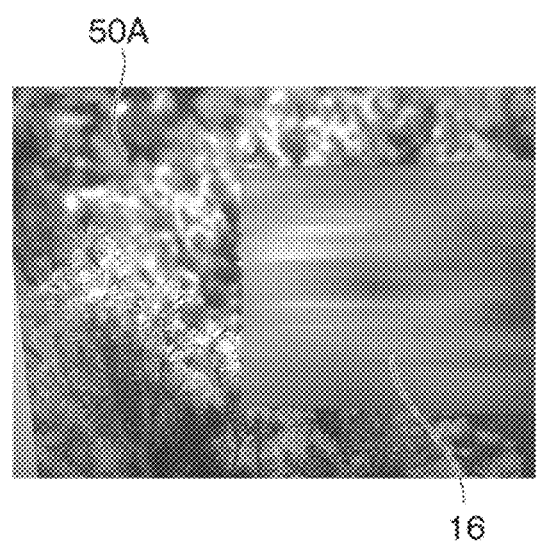
FIG. 11B shows the image of the object shown in FIG. 11A as viewed when only the first panel is installed.
Figure 11C:
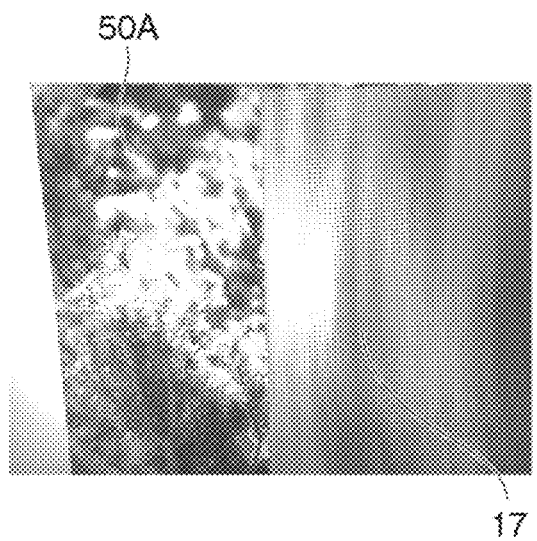
FIG. 11C shows the image of the object shown in FIG. 11A as viewed when only the second panel is installed.

The image of the scenery shown in FIG. 11A is seen by the viewer as shown in FIG. 11B when only the first panel 16 is arranged. The image of the scenery shown in FIG. 11A is seen by the viewer as shown in FIG. 11C when only the second panel 17 is arranged.

Figure 11D:
FIG. 11D shows the image of the object shown in FIG. 11A as viewed when both the first and second panels are installed.

In contrast, when both the first and second panels 16 and 17 are arranged, the image of a bird 52A overlaps with the image of the tree background 50A and becomes hardly visible to the viewer, as shown in FIG. 11D.

Third Example Embodiment

The configuration for the third example embodiment of this disclosure, which embodies FIGS. 1 and 2, is described with reference to FIGS. 12A to 14. In FIGS. 12A to 14, components common to FIGS. 1 to 11D are denoted with the reference numerals to simplify the explanation.

This third example embodiment is suitable for concealment when there is a large difference in color between the background and the object.

Figure 12A:
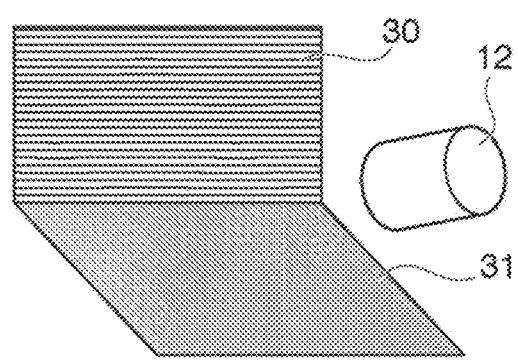
FIG. 12A is an explanatory diagram of a concealment system according to the third example embodiment, showing a perspective view before installing the concealment body.

As shown in FIG. 12A, the image of the background 30 and the floor 31 connected thereto are acquired by the imaging unit 12. Here, the background 30 is, for example, a colored horizontal stripe image with a predetermined ratio of R (red) G (green) and B (blue).

In this case, the result of the calculation of the elements by the image processing device captured by the aforementioned imaging unit 12 is "H (horizontal): 100%, V (vertical): 0%, R: 214, G: 146, B: 77 (color code value)."

Figure 13A:
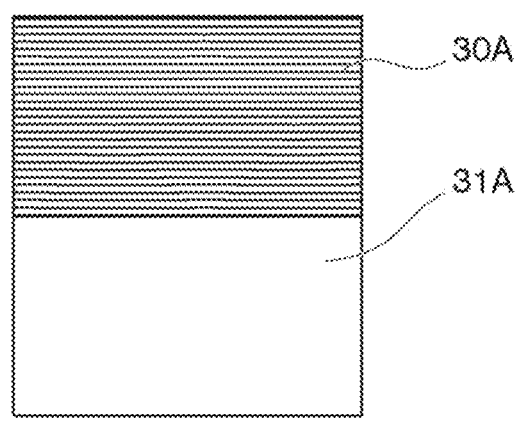
FIG. 13A is an explanatory diagram of an image captured by the imaging device of the concealment system of FIG. 12A.
Figure 13B:
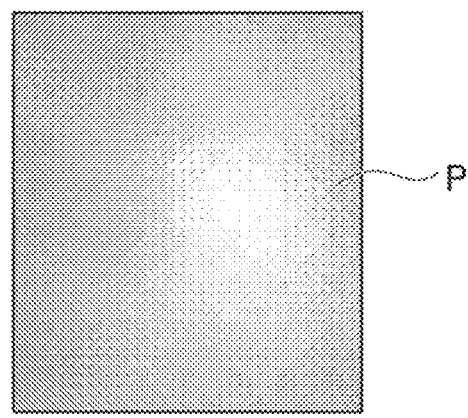
FIG. 13B is a diagram showing the pixels of the image shown in FIG. 13A.

FIG. 13B shows a pixel P corresponding to "H (horizontal): 100%, V (vertical): 0%, R: 214, G: 146, B: 77" in the images 30A, 31A of FIG. 13A.

Figure 14:
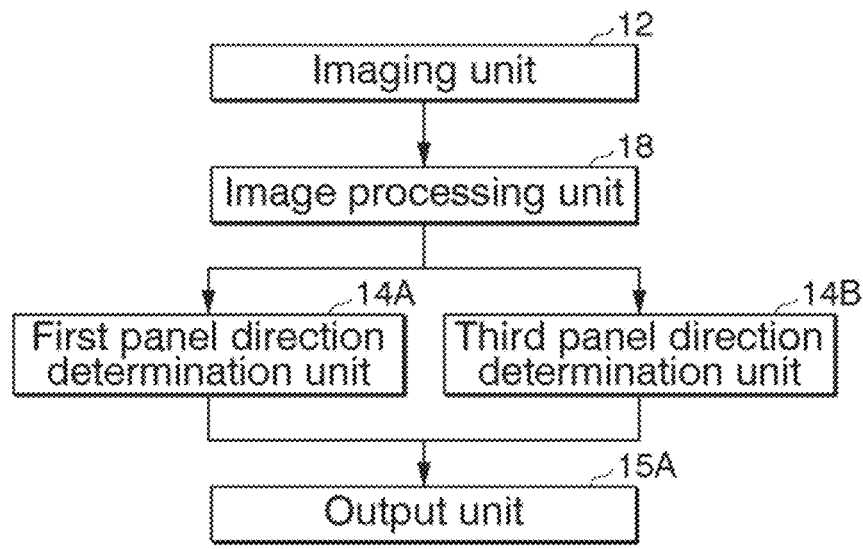
FIG. 14 is a block diagram of the image processing portion of the concealment system according to the third example embodiment.

The configuration of the device that performs the above image processing is explained with reference to FIG. 14.

The imaging unit 12 sends the image data of the background 30 to the image direction calculation unit (image processing unit) 13. The image direction calculation unit 13 calculates the overall light-reception level change in each of the horizontal and vertical directions, and calculates the average light-reception level for each color element R, G, and B. A first panel direction determination unit 14A determines the direction of the background based on index values of the change in each of H and V. A third panel color determination unit 14B also determines the average background color. The output unit 15A outputs the direction and color and notifies the user. In the example in FIG. 14, the output of the output unit 15A is the orientation of the first panel and the color of the panel that should be a third panel 18.

Figure 12B:
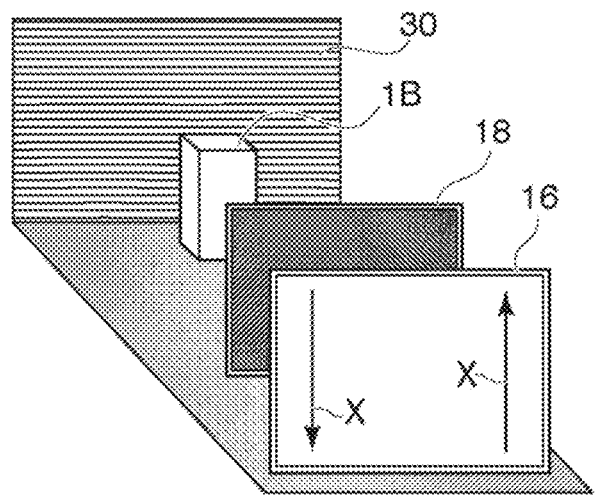
FIG. 12B is an explanatory diagram of the concealment system according to the third example embodiment, showing a perspective view after installing the concealment body.

Specifically, the average value per pixel (a number indicating the average color) is calculated by dividing the sum of each RGB component of all pixels in the image data by the number of dots. As shown in FIG. 12B, the third panel 18 colored with that color (the color of the average value) is arranged between the object 1 and the first panel 16. The third panel 18 can conceal the object 1 by being positioned to the inside of the line segment connecting the contour of the first panel 16 and the object 1 as the vanishing point. For this reason, the planar shape of the third panel 18 may be smaller than the first panel 16. As the third panel 18, a panel of approximately the same planar shape as the object 1 may be arranged in close contact with the front surface of the object 1.

By thus placing the third panel 18, which has a color close to the average value of the colors of the background 30, in front of the object 1, the image of the third panel 18 blended seamlessly with the background 30 is observed by the viewer through the first panel 16. As a result, a higher concealment effect can be achieved.

Fourth Example Embodiment

The configuration for the fourth example embodiment of the present disclosure, which embodies FIGS. 1 and 2, is described with reference to FIGS. 15A to 24B. In FIGS. 15A to 24B, components common to FIGS. 1 to 14 are denoted with the same reference numerals to simplify the explanation.

Figure 15A:
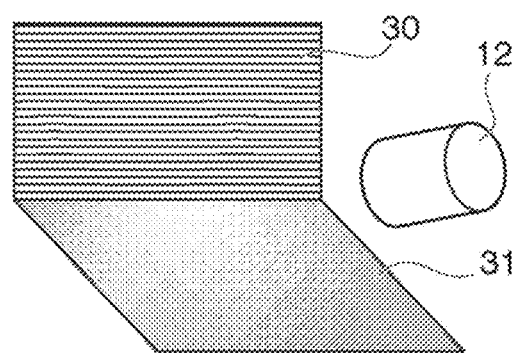
FIG. 15A is an explanatory diagram of the concealment system according to the fourth example embodiment, showing a perspective view before installing the concealment body.
Figure 19A:
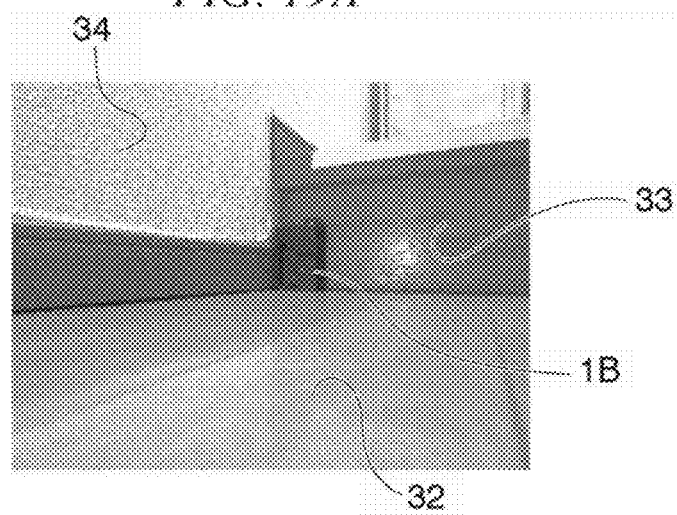
FIG. 19A is a diagram showing an image of an object to be concealed by the application of the fourth example embodiment, showing an image before installing the concealment body and applying camouflage to the object.

The fourth example embodiment uses so-called camouflaged third panels 18A-18D, as illustrated in FIGS. 17A to 17D, instead of the monochromatic third panel 18 employed in the third example embodiment. As shown in FIG. 15A, an image of the background 30 and the floor 31 connected thereto is acquired by the imaging unit (imaging device) 12. Here, the background 30 and floor 31 are more specifically the interior of a typical house having a floor 32, a waist wall 33, and a wall 34, as shown in FIG. 19A.

Figure 18:
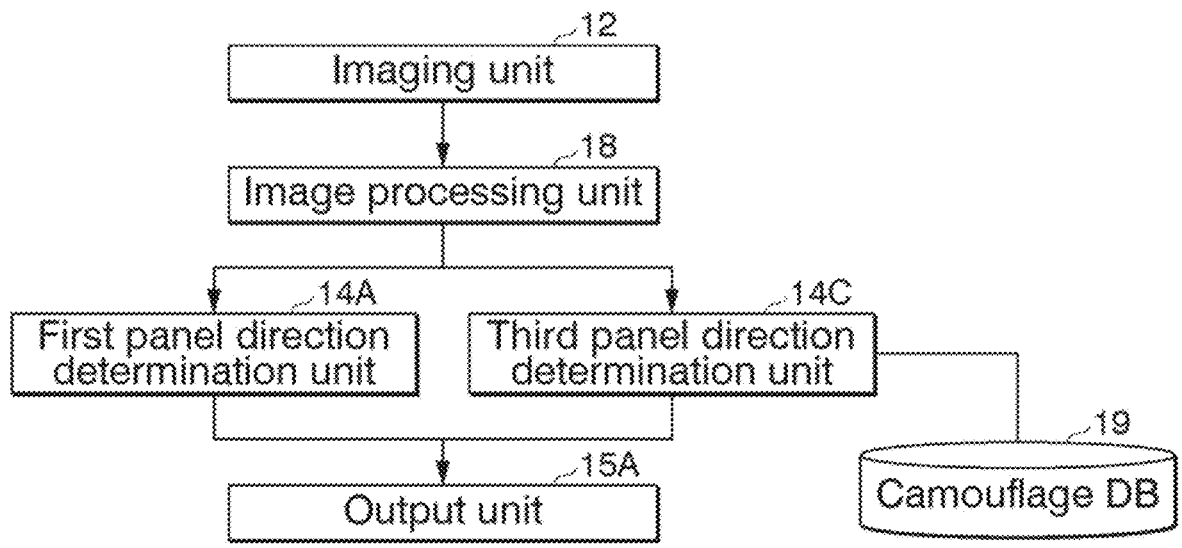
FIG. 18 is a block diagram of the image processing portion of the concealment system according to the fourth example embodiment.

The configuration of the device that performs the above image processing will be explained with reference to FIG. 18.

The imaging unit 12 sends the image data of the background 30 to the image direction calculation unit (image processing unit) 13, which calculates the direction of the image. The image direction calculation unit 13 calculates the overall light-reception level change in each of the horizontal and vertical directions, as well as the average light-reception level for each color element R, G, and B. The first panel direction determination unit 14A determines the pseudo direction of the background based on index values of the change in each of H and V. The third panel pattern determination unit 14C selects and determines the optimal camouflage from the camouflage patterns (image data of shape, hue, saturation, lightness, and the like that constitute the camouflage of the third panels 18A to 18D exemplified in FIGS. 17A to 17D) stored in a camouflage DB (database) 19 based on the color distance of the object to the average background color. The output unit 15A outputs a pseudo direction and camouflage pattern and notifies the user.

Figure 15B:
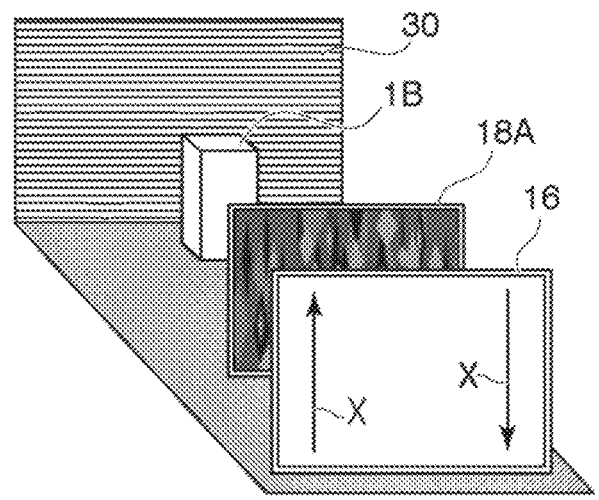
FIG. 15B is an explanatory diagram of the concealment system according to the fourth example embodiment, showing a perspective view after installing the concealment body.
Figure 16A:
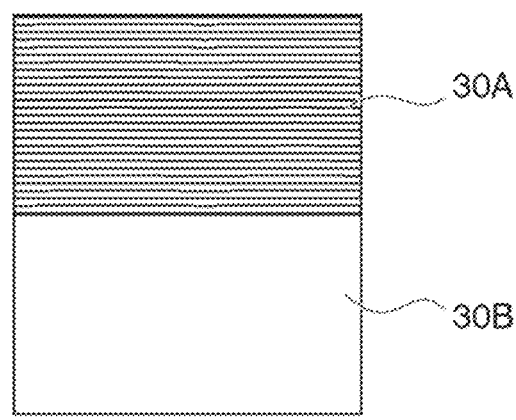
FIG. 16A is an explanatory diagram of an image captured by the imaging device of the concealment system of FIG. 15A.
Figure 16B:
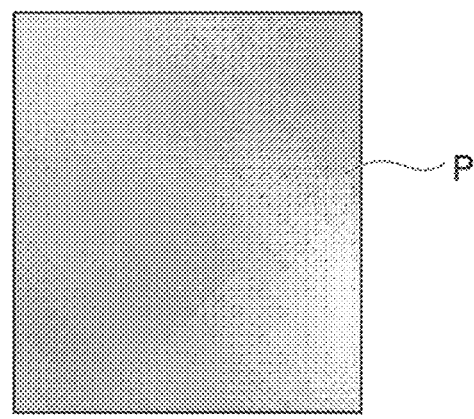
FIG. 16B is a diagram showing the pixels of the image shown in FIG. 16A.

Based on the camouflage pattern and pseudo direction output from output unit 15A, the user arranges the third panel 18A in front of the object 1 in front of the background 30, and the first panel 16 is placed further forward, as shown in FIG. 15B.

FIGS. 17A through 17D show examples of camouflage patterns for the third panels 18A through 18D stored in the camouflage DB 19. The following is a supplemental explanation of the colors and shapes of the camouflage patterns shown in FIGS. 17A through 17D, which are represented in monochrome.

Figure 17A:
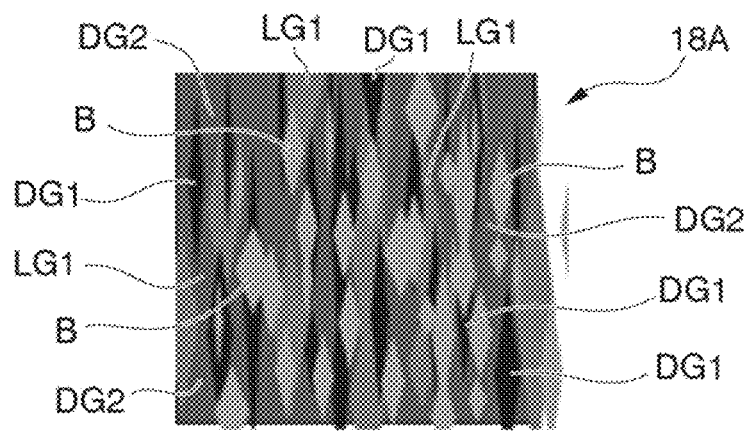
FIG. 17A is a diagram showing an example of a camouflage pattern used in the concealment system according to the fourth example embodiment.

The camouflage pattern in the third panel 18A in FIG. 17A has a basic configuration of vertically elongated diamond-shaped squares with various combinations of vertical and horizontal ratios or absolute values of vertical and horizontal lengths. The camouflage pattern of the third panel 18A has vivid colors as a whole. The area indicated by the code DG1 is the most intense dark green color. The area indicated by the code LG1 is the lightest pale green color. The green color gradually becomes lighter in each of the areas indicated by the codes DG1, DG2, and LG1. The area indicated by the code B is brown.

Figure 17B:
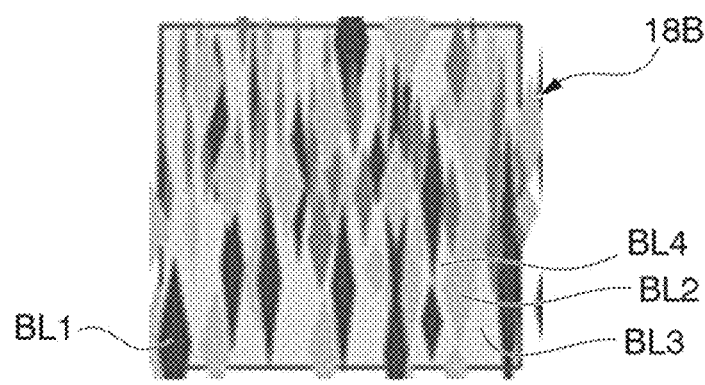
FIG. 17B is a diagram showing an example of a camouflage pattern used in the concealment system according to the fourth example embodiment.

The camouflage pattern in the third panel 18B in FIG. 17B is a monochrome image with a basic configuration of vertically elongated diamond-shaped squares with various combinations of vertical and horizontal ratios or absolute values of vertical and horizontal lengths. Starting from the area indicated by code BL1, which is closest to black, the areas indicated by the codes BL2, BL3, and BL4 gradually change to a lighter gray color close to white.

Figure 17C:
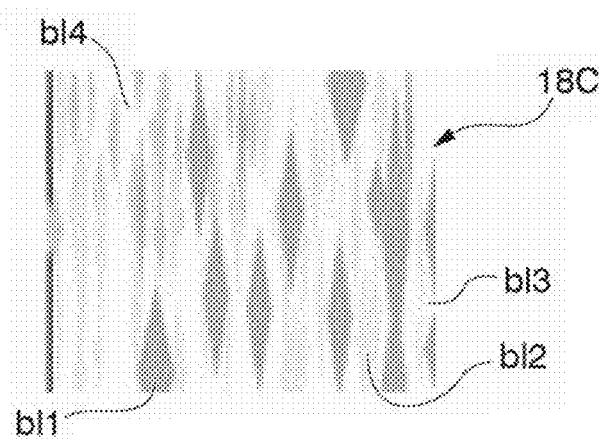
FIG. 17C is a diagram showing an example of a camouflage pattern used in the concealment system according to the fourth example embodiment.

The camouflage pattern in the third panel 18C in FIG. 17C is a monochrome image with a basic configuration of vertically elongated diamond-shaped squares with various combinations of vertical and horizontal ratios or absolute values of vertical and horizontal lengths. Starting from the area indicated by code b11, which is closest to black, the areas indicated by the codes b12, b13, and b14 gradually change to a lighter gray color close to white.

The camouflage pattern of the third panel 18B has a more distinct black-and-white contrast than the camouflage pattern of the third panel 18C.

Figure 17D:
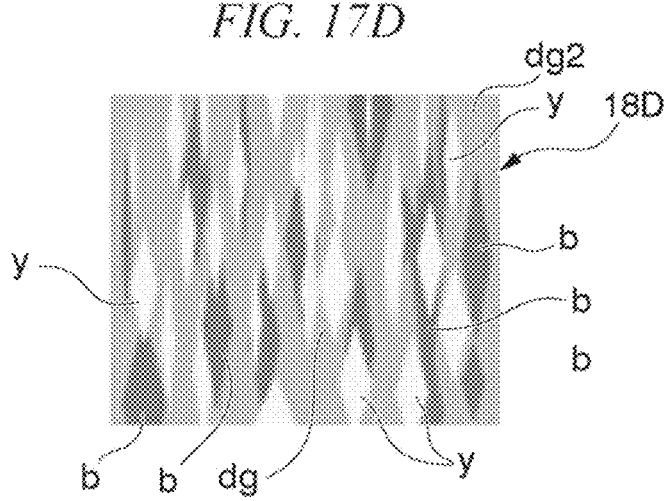
FIG. 17D is a diagram showing an example of a camouflage pattern used in the concealment system according to the fourth example embodiment.

The camouflage pattern of the third panel 18D in FIG. 17D has a basic configuration of vertically elongated diamond-shaped squares with various combinations of vertical and horizontal ratios or absolute values of vertical and horizontal lengths. The camouflage pattern of the third panel 18D has a pale color tone overall (compared to the camouflage pattern of the third panel 18A) with pastel colors. The area indicated by the code b is brown, the area indicated by the code dg is relatively dark green, and the area indicated by the code y is yellow.

The average color composition of the camouflage patterns in the above third panels 18A to 18D, indicated by color codes, is as follows:
  Third panel 18A R=56, G=87, B=35
  Third panel 18B R=191, G=191, B=191
  Third panel 18C R=242, G=242, B=242
  Third panel 18D R=198, G=157, B=64

Since the camouflage pattern of the third panel 18A is darker compared to the camouflage pattern of the third panel 18D, the overall level of detected light is lower. The camouflage patterns in the third panels 18B and 18C are monochrome, so the levels are equal among the RGB components. The camouflage pattern in the third panel 18B has higher contrast and a darker black compared to the camouflage pattern of the third panel 18C, resulting in lower overall light levels.

Here, the color average distance dxy, which is an index of color composition, is the difference between the average color X of the background and the average color Y of the camouflage, and can be calculated by the following Equation (1):

$$dxy=\{(X_R-Y_R)^2+(X_G-Y_G)^2+(X_B-Y_B)^2\}^{1/2} \tag{1}$$

The camouflage pattern with a small color average distance (e.g., the third panel 18D) is selected and arranged between the object 1B and first panel 16. More specifically, the camouflage pattern shown in FIG. 20 can be applied to the surface of the object 1B, which is a carrying case, to conceal the object 1B. In the fourth example embodiment, the camouflage pattern painted on the surface of object 1B (or a sheet with a similar camouflage pattern applied to its surface and attached to the surface of the object) shall constitute the third panel 18D.

Here, the first panel 16 is arranged with the X direction (first direction) oriented vertically, since the background is the waist wall 33 with a wide horizontal plane (sideways orientation). In addition, the pseudo direction of the third panel 18A is arranged in a direction along the X direction (first direction) of the first panel 16.

Figure 20:
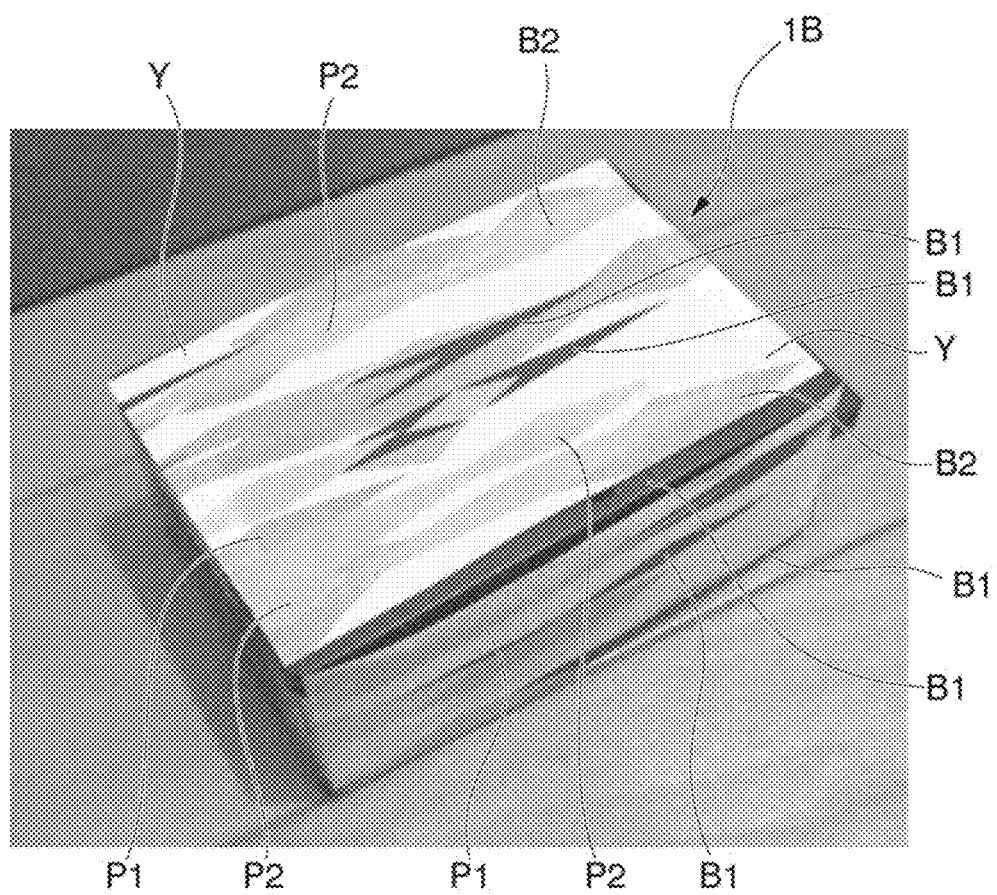
FIG. 20 is a perspective view showing details of the camouflage used in FIG. 19B.

The camouflage pattern shown in FIG. 20 has a pastel-colored pattern with vertically elongated diamond shapes or similar shapes. The areas indicated by the code B1 in FIG. 20 are dark blue, the areas indicated by the code B2 are slightly lighter blue, the areas indicated by the code P1 are dark pink, the areas indicated by the code P2 are slightly lighter pink, and the areas indicated by the code Y are yellow.

Figure 19B:
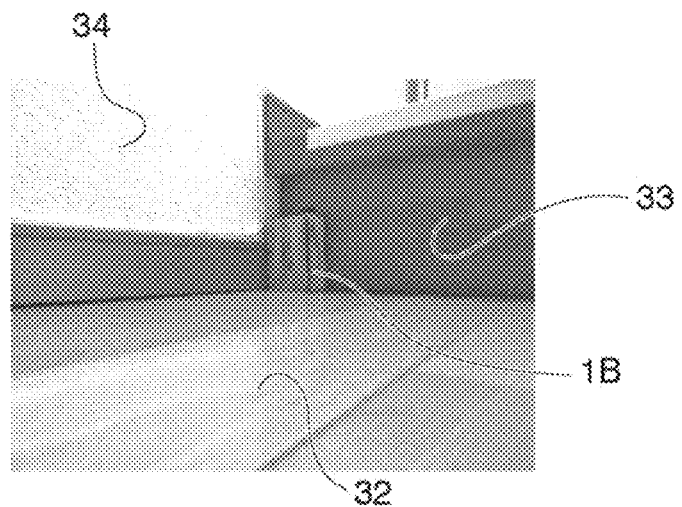
FIG. 19B shows an image before installing a concealment body and after applying camouflage to the object.
Figure 19C:
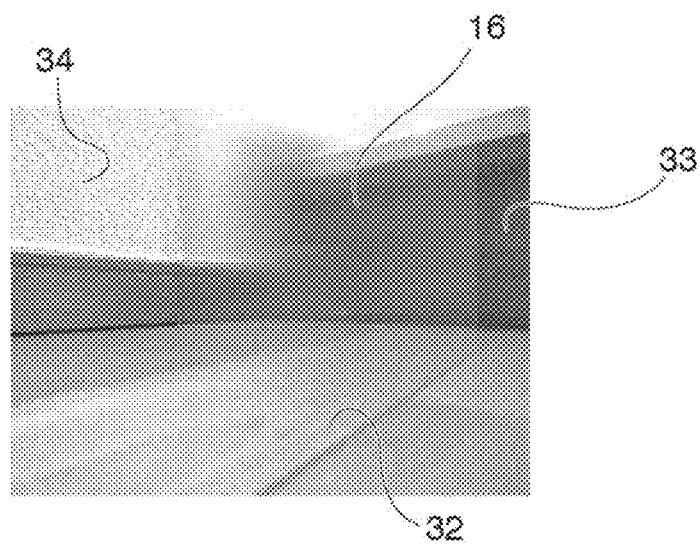
FIG. 19C shows the image that is visible after the concealment body has been installed.

The following is an example of using a panel with such a camouflage pattern (an example of the third panel). As shown in FIG. 19A, the object 1B, which is originally solid black, is arranged in the corner of the room as the background 30. Moreover, as shown in FIG. 19B, the surface of the object 1B is covered with the camouflage pattern shown in FIG. 20. In this case, as shown in FIG. 19C, the first panel 16 can conceal the object 1B to the extent that it is difficult to distinguish the boundary between the object 1B and the background 30.

Figure 21A:
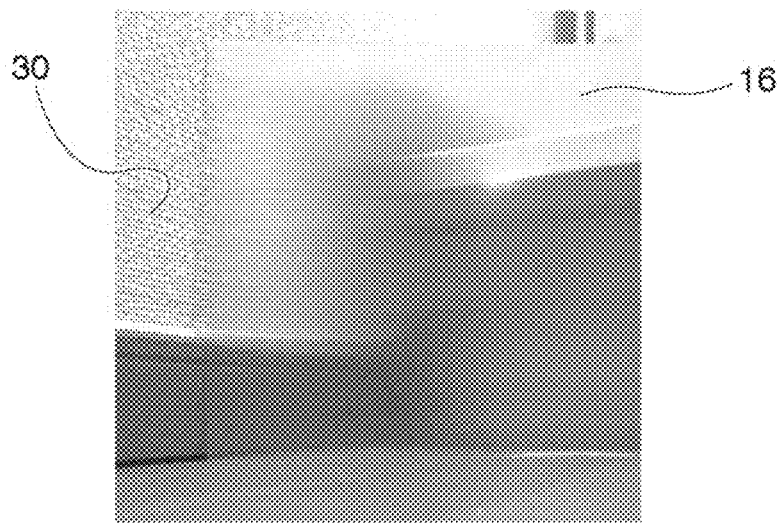
FIG. 21A is a diagram showing an image of an object to be concealed by the application of the fourth example embodiment, showing an image of the object visible when only the first panel is installed.
Figure 21B:
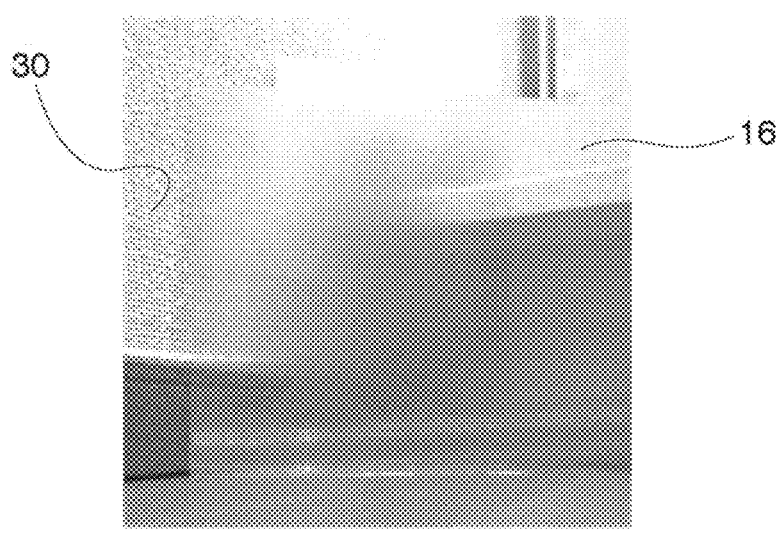
FIG. 21B is a diagram showing an image of an object to be concealed by the application of the fourth example embodiment, showing an image of the object visible when lenticular lenses are installed as the first panel and the second panel.
Figure 21C:
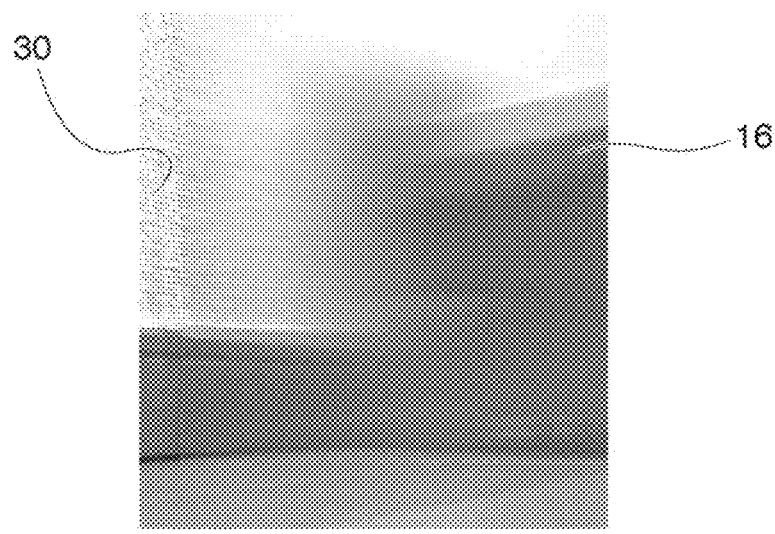
FIG. 21C is a diagram showing an image of an object to be concealed by the application of the fourth example embodiment, showing an image of the object visible when a lenticular lens is installed as the first panel and a panel having camouflage is installed as the third panel.

FIGS. 21A to 21C show further experimental examples.

FIG. 21A shows an image when only the first panel 16 is arranged with the first direction oriented vertically. FIG. 21B is an image seen when the first panel 16 using a lenticular lens with the first direction (X direction) oriented vertically and the second panel 17 (not shown) using a lenticular lens with the first direction (X direction) oriented horizontally are arranged. FIG. 21C is an image seen when the first panel 16 using a lenticular lens with the X direction (first direction) oriented vertically and the camouflaged third panel 18A (or third panels 18B, 18C, and 18D) are arranged.

From these examples, it is understood that overlaying the first panel 16 and the third panel 18A (or the third panels 18B, 18C, and 18D) enhances the concealment effect on the object 1B.

Fifth Example Embodiment

FIGS. 22A to 23B show the fifth example embodiment.

Figure 22A:
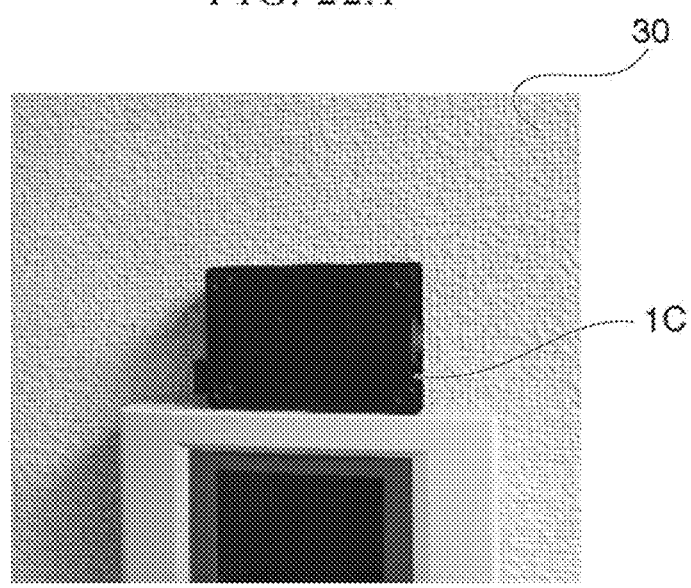
FIG. 22A is a diagram showing a comparative example of an image of an object to be concealed by the application of the fourth example embodiment provided on another background, showing the image when the object is not concealed.
Figure 22B:
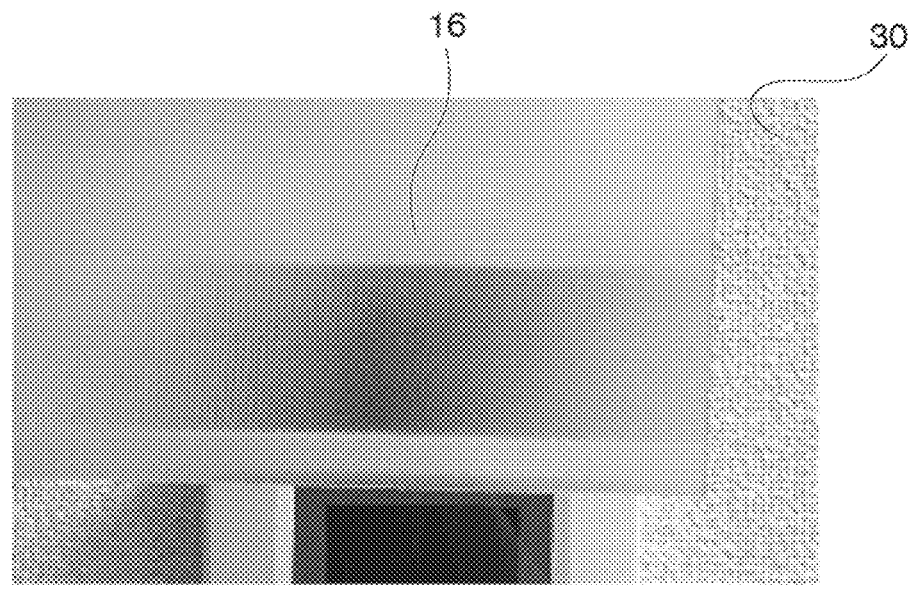
FIG. 22B shows an image of the object shown in FIG. 22A, as seen when only the first panel is installed.

An object 1C in this fifth example embodiment is a black monochrome pouch, as shown in FIG. 22A. By concealing this pouch by the first panel 16, an image is observed to the extent that the presence of the object 1C can be seen, as shown in FIG. 22B.

Figure 23A:
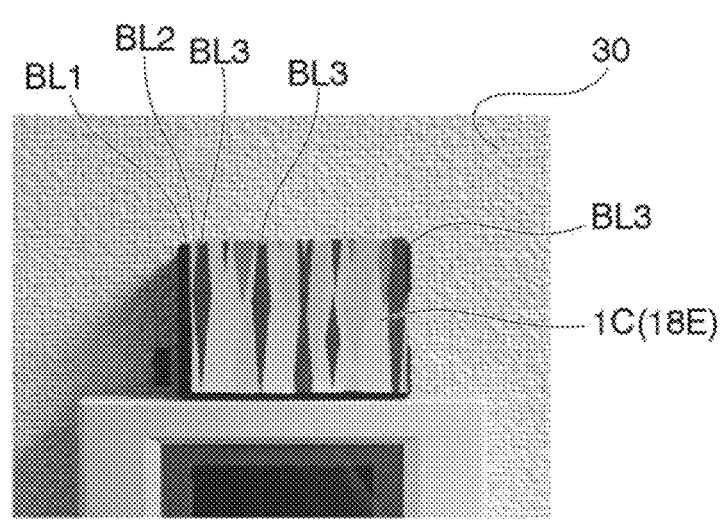
FIG. 23A is a diagram showing an image of an object to be concealed by the application of the fourth example embodiment provided on another background, showing the image when the object is not concealed.
Figure 23B:
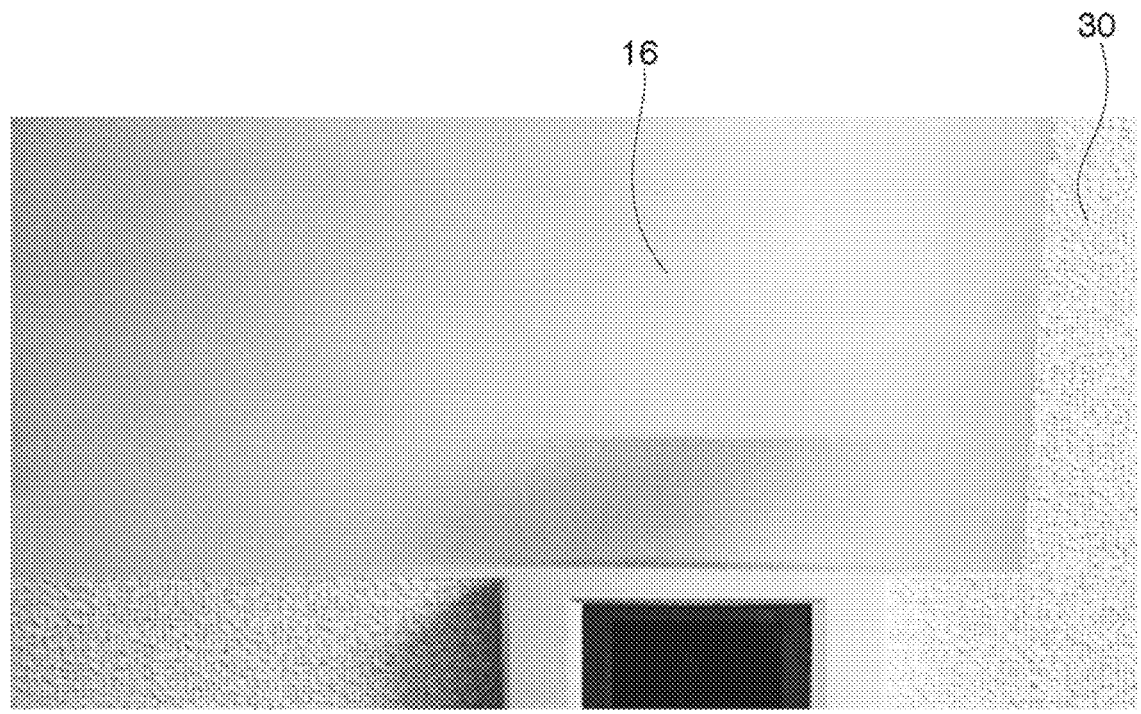
FIG. 23B shows the image when the object shown in FIG. 23A is concealed.

In contrast, as shown in FIG. 23A, a third panel 18E in which monotone vertically elongated diamond-shaped figures are drawn in dark black BL1, slightly dark gray BL2, and lighter gray BL3 are drawn is arranged. In this case, the image of the object 1C observed through the first panel 16 blends almost completely into the background 30, as shown in FIG. 23B. The third panel 18E is not limited to a panel placed between the object and the first panel 16, but can be a layer of color in which the camouflage shown is applied directly to the surface of the object 1C.

Figure 24A:
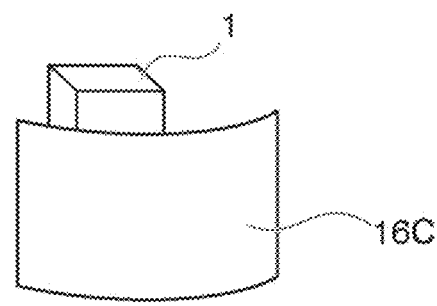
FIG. 24A is a diagram showing a modification example of the example embodiment of the present disclosure, being a perspective view of the appearance of the concealment panel.
Figure 24B:
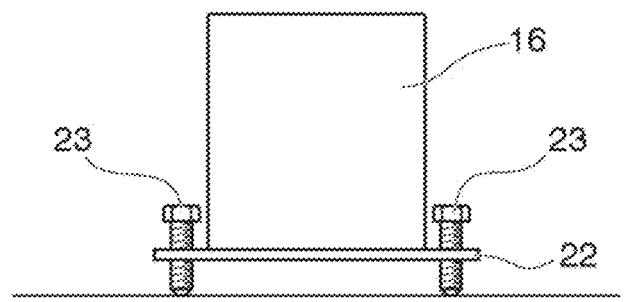
FIG. 24B is a diagram showing a modification example of the example embodiment of the present disclosure, showing a front view of the concealment panel.

FIGS. 24A and 24B show variations of the first panel provided with the lenticular lens used in the first through fifth example embodiments.

Specifically, the first panel 16C shown in FIG. 24A is curved into a cylindrical surface surrounding the object 1. That is, the first panel 16C surrounds the object 1 and is curved, with the first direction oriented in a direction orthogonal to the pseudo direction of the background. This allows for the effect of concealing the object 1 from viewers in various directions around the object 1.

As shown in FIG. 24B, the first panel 16 can be placed on a stand 22 with the first or second direction in a vertical orientation, and a bolt 23 as a vertically movable lifting device can be provided at both ends of this stand 22. In other words, by arranging the first panel 16 to be tilted at a non-horizontal position by adjusting the downward protrusion of these two bolts 23, the inclination of the first panel 16 can be adjusted for deviations of the background pseudo direction from horizontal or vertical, so that the first or second direction can be made exactly perpendicular to the pseudo direction. Instead of the aforementioned bolts 23, electric motors, pneumatic devices, and the like may be used to automatically adjust the inclination of the first panel 16.

Lenticular lenses are employed as the first panel 16 and second panel 17 in the above example embodiments, but the components are not limited to such examples. As the first panel 16 and the second panel 17, panels of other configurations with a set of optical elements having properties of refracting light rays in a predetermined direction may be employed, such as a configuration of prisms, or a configuration of cylinder lenses with cross-sectional shapes that form part of a cylindrical surface.

Additionally, other patterns may also be adopted as camouflage patterns, depending on the brightness, color, size and shape of the background.

As a method of changing the camouflage pattern, it is possible to adopt methods such as replacing the sheet directly attached to the object to be concealed, replacing the panel placed on the floor, or keeping a roll-shaped sheet on which are displayed multiple types of camouflage patterns and selectively placing the required location in front of the object to be concealed by unwinding from one roll and winding onto another roll.

The example embodiments of the present disclosure have been described in detail with reference to the drawings. Specific configurations are not limited to this example embodiment, and design changes and the like are included to the extent that they do not depart from the gist of the invention.

Priority is claimed on Japanese Patent Application No. 2021-056507, filed on Mar. 30, 2021, the content of which is incorporated herein by reference.

INDUSTRIAL APPLICABILITY

This disclosure can be used to conceal an object.

DESCRIPTION OF REFERENCE SIGNS

1 Object
2 Imaging device
3 Image processing device
4 Direction determination device
5 First concealment body
10 Lenticular lens
11 Semi-cylindrical body (optical element)
12 Imaging unit
13 Image direction calculation unit (image processing unit)
14, 14A First panel direction determination unit
14B Third panel color determination unit
15 Direction output unit
15A Output unit
16, 16C First panel
17 Second panel
18, 18A, 18B, 18C, 18D Third panel (camouflage pattern)
20 Vertical line
21 Horizontal line
22 Stand
23 Bolt (lifting device)
30 Background
30A, 31A Image
31, 32 Floor
33 Waist wall
34 Wall
50 Brick wall (background)
50A Thicket of trees (background)
51 Ground (panel installation surface)
52 Cat (object)
52A Bird (object)

What is claimed is:

1. A concealment method comprising:
acquiring image data showing a background of an object;
detecting a change in a component in a predetermined direction included in the image data;
determining a pseudo direction of the image data on the basis of the result of the detection; and
arranging, between the object and an observation position of the object, a first concealment body including a plurality of optical elements having a property of refracting light rays in a predetermined direction and continuously arranged in an arrangement direction in a state of the arrangement direction being oriented in a direction along the pseudo direction.

2. The concealment method according to claim 1, further comprising:

arranging, between the first concealment body and the object, a second concealment body including a plurality of optical elements having the property and continuously arranged in an arrangement direction, in a state of the arrangement direction of the plurality of optical elements of the second concealment body being oriented in a direction orthogonal to the arrangement direction of the plurality of optical elements of the first concealment body.

3. The concealment method according to claim 1, further comprising:
   calculating the average value of color data contained in the image data; and
   arranging a third concealment body with a color approximating the calculated average value between the first concealment body and the object.

4. The concealment method according to claim 3, wherein the third concealment body includes a combination of a plurality of shapes having a plurality of colors approximating the average value.

5. The concealment method according to claim 4, wherein the plurality of shapes are oriented in the same direction and arranged in multiple rows.

6. The concealment method according to claim 1, wherein at least one of the first concealment body, the second concealment body, and the third concealment body forms a curved surface surrounding a portion of the object.

7. The concealment method according to claim 1, wherein the pseudo direction of the image data is the direction in which the pixel data included in the image data and distributed on a two-dimensional plane changes little.

8. The concealment method according to claim 1, wherein at least one of the first and second concealment bodies is provided with an adjustable angle relative to the installation surface.

9. A concealment system comprising:
   a camera captures an image of an object to acquire image data showing a background of the object;
   a memory configured to store instructions;
   a processor configured to execute the instructions to:
   detect a change in a component in a predetermined direction included in the image data; and
   determine a pseudo direction of the image data on the basis of the result of the detection; and
   a first concealment body including a plurality of optical elements having a property of refracting light rays in a predetermined direction and continuously arranged in an arrangement direction and arranged between the object and an observation position of the object in a state of the arrangement direction being oriented in a direction along the pseudo direction.

* * * * *